(12) United States Patent
Berger et al.

(10) Patent No.: US 11,424,889 B2
(45) Date of Patent: Aug. 23, 2022

(54) REFERENCE SIGNAL SEQUENCE GENERATION

(71) Applicant: QUALCOMM Incorporated, San Diego, CA (US)

(72) Inventors: Peer Berger, Hod Hasharon (IL); Shay Landis, Hod Hasharon (IL); David Yunusov, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/086,074

(22) Filed: Oct. 30, 2020

(65) Prior Publication Data

US 2022/0140965 A1 May 5, 2022

(51) Int. Cl.
*H04L 5/00* (2006.01)
*H04L 27/26* (2006.01)
*H04L 25/02* (2006.01)

(52) U.S. Cl.
CPC ........ *H04L 5/0051* (2013.01); *H04L 27/2607* (2013.01); *H04L 5/001* (2013.01); *H04L 5/0044* (2013.01); *H04L 5/0062* (2013.01); *H04L 25/0224* (2013.01)

(58) Field of Classification Search
CPC .......................... H04L 5/0051; H04L 27/2607
See application file for complete search history.

(56) References Cited

U.S. PATENT DOCUMENTS

| | | | | |
|---|---|---|---|---|
| 2010/0195615 A1* | 8/2010 | Lee | ..................... | H04W 72/042 370/330 |
| 2012/0051319 A1* | 3/2012 | Kwon | ............... | H04W 72/0406 370/329 |
| 2012/0287877 A1* | 11/2012 | Han | ..................... | H04W 74/002 370/329 |
| 2015/0341153 A1* | 11/2015 | Jongren | ............ | H04W 56/0035 370/329 |
| 2018/0048446 A1* | 2/2018 | Jiang | ..................... | H04L 5/0051 |

* cited by examiner

*Primary Examiner* — Kevin C. Harper
(74) *Attorney, Agent, or Firm* — Holland & Hart LLP

(57) ABSTRACT

Methods, systems, and devices for wireless communications are described. A first wireless device may identify a reference signal sequence (e.g., a demodulation reference signal (DMRS) sequence) based on a cyclic shift associated with a control channel for communications with a second wireless device. For example, the first wireless device may identify the cyclic shift associated with transmitting a message to the second wireless device via the control channel. In another example, the first wireless device may estimate the cyclic shift associated with receiving a message from the second wireless device via the control channel. The first wireless device may then communicate with the second wireless device based on the reference signal sequence. For example, the first wireless device may transmit or receive (e.g., via a shared channel) the reference signal sequence to or from the second wireless device.

45 Claims, 11 Drawing Sheets

REFERENCE SIGNAL SEQUENCE GENERATION

FIELD OF TECHNOLOGY

The following relates to wireless communications, including reference signal sequence generation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless devices (e.g., UEs, base stations) may utilize reference signals to estimate conditions of the transmission channel. It may be desirable to utilize reference signals that enable reliable channel estimations.

SUMMARY

The described techniques relate to improved methods, systems, devices, and apparatuses that support reference signal sequence generation. Generally, the described techniques provide for identifying a reference signal sequence from a set of possible reference signal sequences. That is, there may be a set of predefined reference signal sequences (e.g., more than ten predefined reference signal sequences), and the wireless devices may identify the reference signal sequence for communications between the wireless devices. For example, each wireless device may identify a reference signal sequence based on a cyclic redundancy check (CRC) associated with a control channel between the wireless devices and a subframe index. In some instances, each wireless device may additionally identify the reference signal sequence based on a cyclic shift associated with the control channel. A transmitting wireless device may then transmit the identified reference signal to a receiving wireless device, and the receiving wireless device may perform channel estimations for communications with the transmitting wireless device based on receiving the reference signal. For example, the receiving wireless device may perform frequency offset estimation based on receiving the reference signal.

DETAILED DESCRIPTION

Figure 1:
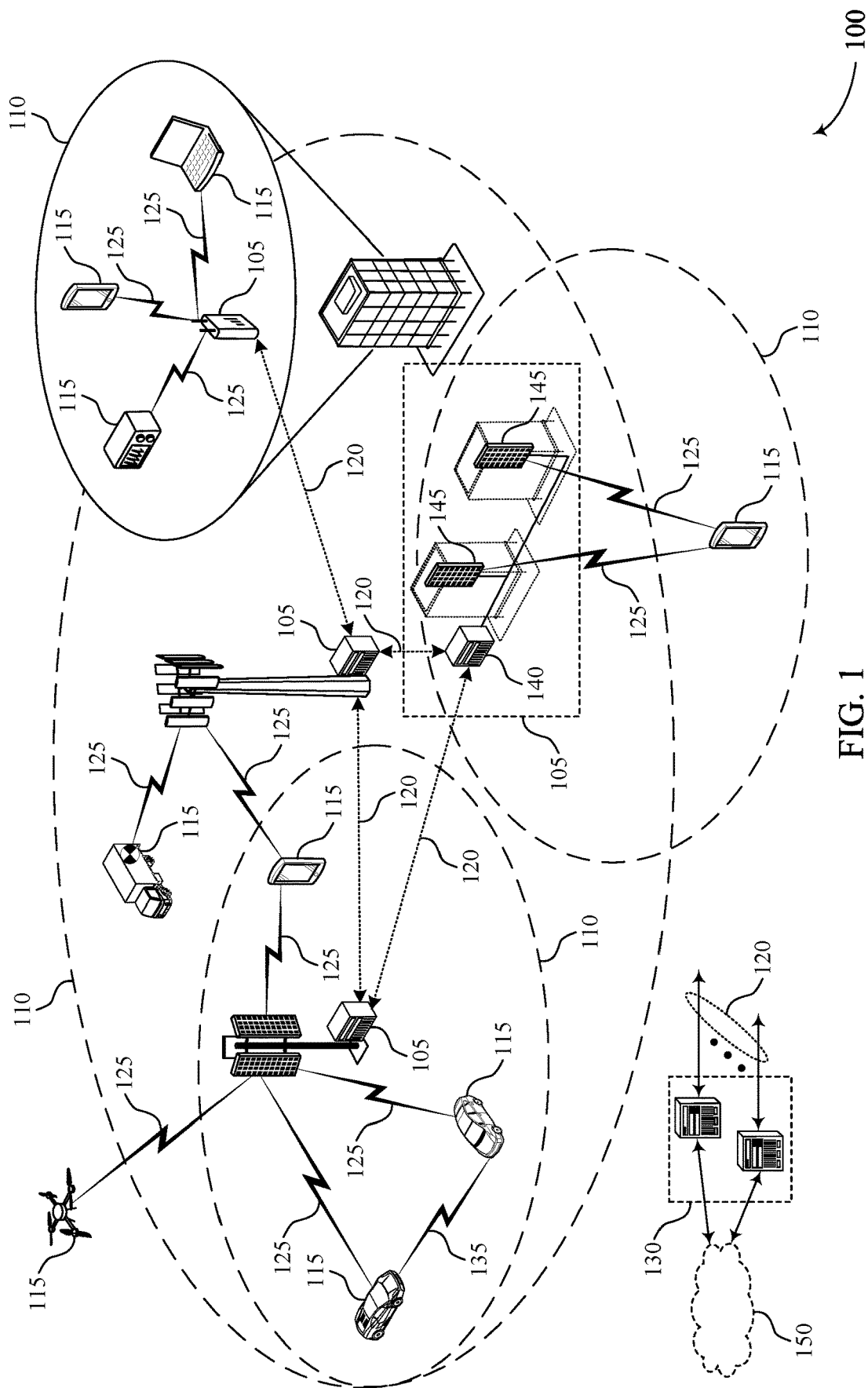
FIG. 1 illustrates an example of a system for wireless communications that supports reference signal sequence generation in accordance with aspects of the present disclosure.

In some wireless communications systems, wireless devices (e.g., user equipments (UEs), base stations) may rely on reference signals to perform channel estimations. That is, a transmitting wireless device may transmit a reference signal to a receiving wireless device, and the receiving wireless device may perform channel estimations based on the received reference signal. The reference signal may be based on a predefined reference signal sequence, and a receiving wireless device may estimate the channel conditions based on the received reference signal and the predefined reference signal sequence. In some cases, when the receiving wireless device performs a frequency offset estimation in the time domain (e.g., which may support high Doppler spread scenarios), there may be one or more reference signal sequences that cause significant degradation in time domain estimations. That is, the reference signal sequences in the time domain may not have a unit absolute power per element (which the reference signal sequences in the frequency domain may have), which may potentially result in the significant degradation. For example, one of the ten different possible reference signal sequences may cause significant degradation in time domain estimations. To minimize a likelihood of wireless devices using a reference signal sequence that causes degradation in time domain estimations, there may be more than ten reference signal sequences defined. For example, there may be one hundred reference signal sequences defined. Here, a likelihood that wireless devices use a reference signal sequence that causes degradation in time domain estimations may decrease (e.g., from one in ten to one in one hundred because the proportion of bad sequences is much lower than 10%).

Additionally, some reference signal sequences may cause cross interference between some UEs. That is, multiple UEs may transmit via a same control channel (e.g., by using different cyclic shifts for the control channel). In some instances, reference signal sequences may be the same for UEs that are associated with the same sidelink control information (SCI) (e.g., the payload of a control channel that may enable the UEs to decode a shared channel). Here, shared channel transmissions by UEs that are associated with the SCI may rely on the same reference signal sequences, which may cause cross interference between those UEs. To decrease a cross-interference between UEs that are associated with the same SCI, wireless devices may select reference signal sequences based on a cyclic shift associated with the control channel. Thus, even if multiple UEs are associated with the same SCI, the differing cyclic shifts may result in unique reference signal sequences associated with each UE, thereby reducing cross interference between those UEs (e.g., due to different reference signal cross correlation).

Generally, the described techniques provide for identifying a reference signal sequence from a set of possible reference signal sequences. That is, there may be a set of predefined reference signal sequences (e.g., more than ten predefined reference signal sequences), and the wireless devices may identify the reference signal sequence for communications between the wireless devices. In some instances, each wireless device may identify the reference signal sequence based on a cyclic shift associated with the control channel. A transmitting wireless device may then transmit the identified reference signal to a receiving wireless device, and the receiving wireless device may perform channel estimations for communications with the transmitting wireless device based on receiving the reference signal. For example, the receiving wireless device may perform frequency offset estimation based on receiving the reference signal. In some cases, identifying a reference signal sequence from a set of possible reference signal sequences that includes more than ten possible reference signal sequences and based on the cyclic shift associated with the control channel may improve a reliability of communications between wireless devices when compared to identifying the reference signal sequence from a smaller set of possible reference signal sequences and not based on the cyclic shift.

Aspects of the disclosure are initially described in the context of wireless communications systems. Aspects of the disclosure are then described in the context of a process flow. Aspects of the disclosure are further illustrated by and described with reference to apparatus diagrams, system diagrams, and flowcharts that relate to reference signal sequence generation.

FIG. 1 illustrates an example of a wireless communications system 100 that supports reference signal sequence generation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless devices (e.g., UEs 115, base stations 105) may rely on reference signals to perform channel estimations. For example, a transmitting wireless device may transmit a reference signal to a receiving wireless device, and the receiving wireless device may perform channel estimations based on the received reference signal. The reference signal may be based on a predefined reference signal sequence, and a receiving wireless device may estimate the channel conditions based on the received reference signal and the predefined reference signal sequence. In some cases, when the receiving wireless device performs a frequency offset estimation in the time domain (e.g., which may support high Doppler spread scenarios such as such as V2V communications), there may be one or more reference signal sequences that cause significant degradation in frequency offset estimations in the time domain (e.g., a frequency estimation error of 500 Hertz). That is, there may be one or more reference signal sequences with poor peak-to-average power ratio (PAPR) characteristics in the time domain.

As an example, wireless devices may utilize an equation similar to Equation 1, illustrated below, to identify a reference signal sequence.

$$\text{Seed} = f_{CRC} \cdot 2^{14} + \text{mod}(k_{val}, 10) \cdot 2^9 + 510 \quad (1)$$

In the example of Equation 1, Seed may correspond to the reference signal sequence. Additionally, $f_{CRC}$ may correspond to a function based on an CRC associated with a control channel between the wireless devices, and $k_{val}$ may be a value based on a subframe (e.g., for transmitting the reference signal). In the example of Equation 1, there may be ten possible reference signal sequences associated with the CRC. That is, two wireless devices may identify up to ten possible different reference signal sequences associated with communications between the two wireless devices. Here, one of the ten different possible reference signal sequences may cause significant degradation in frequency offset estimations performed in the time domain. In this example, channel estimations performed based on these reference signals may be associated with a block error rate (BLER) floor of 0.1.

A wireless device (e.g., a base station 105, a UE 115) may calculate a frequency offset based on a received reference signal. Equation 2, shown below, illustrates an example equation for calculating frequency offset estimations in the time domain.

$$F_{offset} = C \cdot \text{angle}\left\{ \left( \sum_{0}^{\frac{N}{2}-1} r_i \cdot y_i \right) \cdot \left( \sum_{\frac{N}{2}}^{N-1} r_i \cdot y_i \right) \right\} \quad (2)$$

In the example of Equation 2, $F_{offset}$ may be the calculated frequency offset, C may be a constant, and r may be the reference signal in the time domain (e.g., a demodulation reference signal (DMRS)). Additionally, Equation 2 may be rewritten as shown below in Equation 3 based on an assumption that the channel (e.g., by which the reference signal is transmitted) has additive white Gaussian noise (AWGN).

$$F_{offset} = C \cdot \text{angle}\left\{ e^{j\pi\Delta f} \cdot \left[ \sum_{0}^{\frac{N}{2}-1} (1 + (|s_i|^2 - 1) + s_i^* \cdot n) \cdot e^{-j2\pi \frac{i}{N} \cdot \Delta f} \right]^* \cdot \left[ \sum_{\frac{N}{2}}^{N-1} \left(1 + \left(|s_{i+\frac{N}{2}}|^2 - 1\right) + s_{i+\frac{N}{2}}^* \cdot n\right) \cdot e^{-j2\pi \frac{i}{N} \cdot \Delta f} \right] \right\} \quad (3)$$

In the Example of Equation 3, s may be the reference signal in the time domain and n may be the thermal noise. In some cases, an amount of noise associated with the frequency offset estimation (e.g., $n_{Total}$) may be illustrated by Equation 4, shown below.

$$n_{Total} = n_{seq} + n = (|s_i|^2 - 1) + (s_i^* \cdot n) \quad (4)$$

In the example of Equation 4, if the reference signal sequence has unit absolute power, the noise variance may return back to the original thermal noise (e.g., the reference signal sequence may have a unit variance). This may result in the significant degradation in frequency offset estimations performed in the time domain for one of the reference signal sequences.

To minimize a likelihood of wireless devices using a reference signal sequence that causes degradation in frequency offset estimations performed in the time domain, there may be more than ten reference signal sequences defined. For example, there may be one hundred reference signal sequences defined. Here, a likelihood that wireless devices use a reference signal sequence that causes degradation in time domain estimations may decrease (e.g., from one in ten to one in one hundred). As a result, the BLER floor may also decrease (e.g., to 0.01). Additionally, each wireless device may identify the reference signal sequence based on a cyclic shift associated with the control channel. A transmitting wireless device may then transmit the identified reference signal to a receiving wireless device, and the receiving wireless device may perform channel estimations for communications with the transmitting wireless device based on receiving the reference signal. For example, the receiving wireless device may perform frequency offset estimation based on receiving the reference signal.

Figure 2:
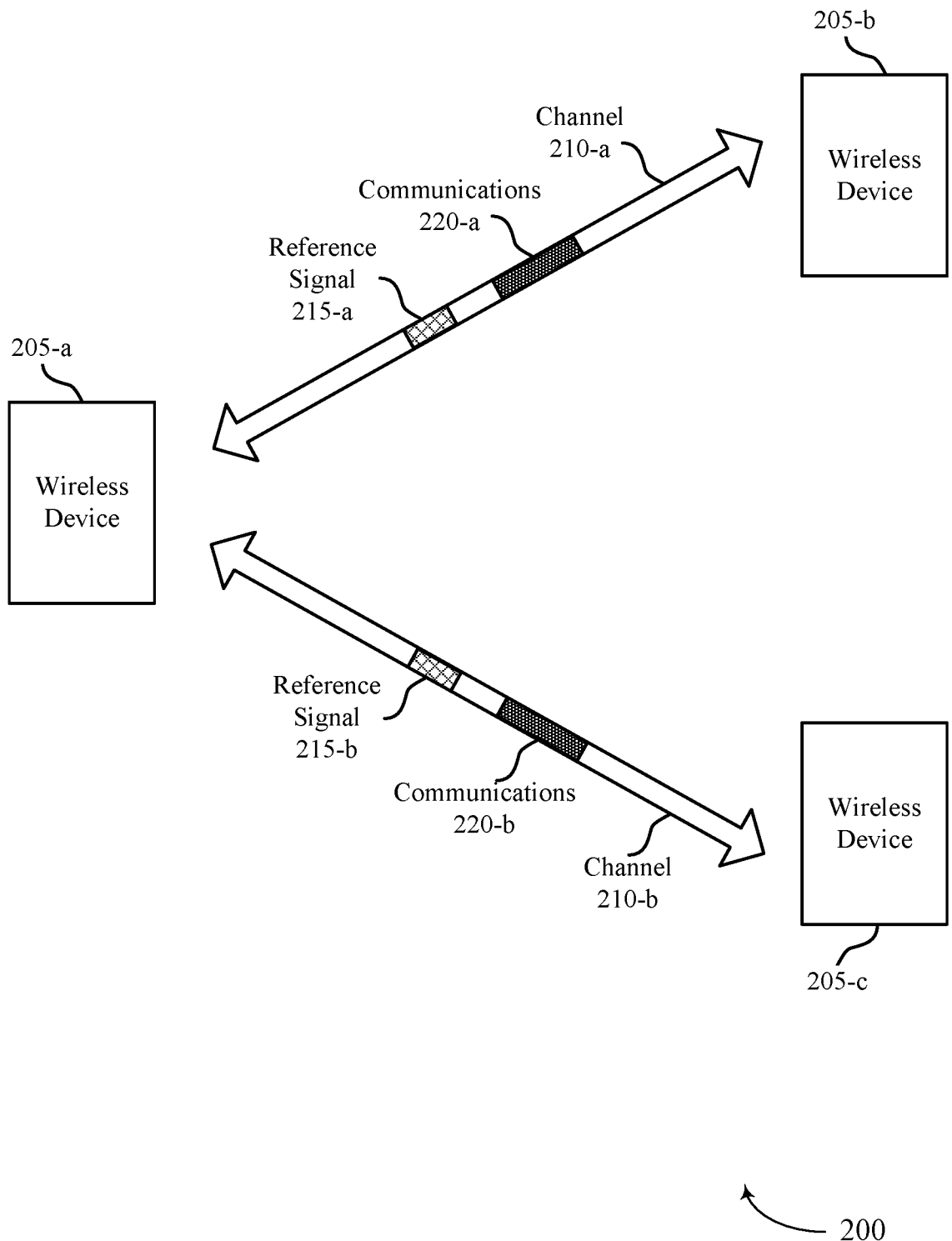
FIG. 2 illustrates an example of a system for wireless communications that supports reference signal sequence generation in accordance with aspects of the present disclosure.

FIG. 2 illustrates an example of a wireless communications system 200 that supports reference signal sequence generation in accordance with aspects of the present disclosure. In some examples, the wireless communications system 200 may implement aspects of wireless communication system 100. For example, the wireless communications system 200 may include wireless devices 205, which may be examples of base stations 105 or UEs 115, as described with reference to FIG. 1. The wireless devices 205 may communicate reference signals 215 and communications 220 via channels 210.

Wireless device 205-a may be in communication with more than one other wireless device 205. For example, wireless device 205-a may be in communication with wireless device 205-b and wireless device 205-c. In some cases, wireless device 205-a may be an example of a base station (e.g., as described with reference to FIG. 1) and wireless devices 205-b and 205-c may be examples of UEs (e.g., as described with reference to FIG. 1).

In some cases, the wireless devices 205 may rely on reference signals 215 to perform channel estimations for the channels 210. For example, the wireless devices 205 may use DMRSs, channel state information-reference signals (CSI-RSs), phase-tracking reference signals (PTRSs), or sounding reference signals (SRSs) to perform channel estimations for the channels 210. In some cases, each wireless device 205 may identify a sequence associated with the reference signal 215 from a set of possible reference signal sequences. That is, wireless devices 205-a and 205-b may identify a reference signal sequence associated with the reference signal 215-a. Additionally, wireless devices 205-a and 205-c may also identify a reference signal sequence associated with the reference signal 215-b.

The wireless devices 205 may identify the reference signal sequence from a set of predefined possible reference signal sequences (e.g., comprising more than ten possible reference signal sequences). For example, each wireless device 205 may identify a reference signal sequence based on CRC associated with a control channel between the wireless devices 205. That is, control channel transmissions between the wireless devices 205-a and 205-b may include one or more CRC bits and the wireless devices 205-a and 205-b may identify a reference signal sequence for the reference signal 215-a based on the CRC bits. Additionally, control channel transmissions between the wireless devices 205-a and 205-c may also include one or more CRC bits and the wireless devices 205-a and 205-c may identify a reference signal sequence for the reference signal 215-b based on the CRC bits.

In some cases, the control channel transmissions between the wireless device 205-a and the wireless devices 205-b and 205-c may be the same. For example, the wireless device 205-a may broadcast a control channel transmission with a shared payload (e.g., the same SCI) to both the wireless devices 205-b and 205-c. Here, the CRC associated with the control channel between the wireless device 205-a and wireless devices 205-b and 205-c may be the same. In some instances, each wireless device 205 may additionally identify the reference signal sequence for the reference signals 215 based on a cyclic shift associated with the control channel. Thus, even in cases that the CRC associated with the control channel between the wireless device 205-a and the wireless devices 205-b and 205-c are the same, the reference signal sequences for the reference signals 215-a and 215-b may be different (e.g., due to unique cyclic shifts).

That is, even in a case that the wireless device 205-a and the wireless devices 205-b and 205-c communicate the same SCI via a control channel, the wireless devices 205-b and 205-c may each be associated with a unique cyclic shift for control channel transmissions. As a result, the wireless devices 205-a and 205-b may identify a first reference signal sequence for the reference signal 215-a that is different from a second reference signal sequence for the reference signal 215-b identified by the wireless devices 205-a and 205-c.

Prior to identifying the reference signal sequence for the reference signals 215, each wireless device 205 may calculate the cyclic shift associated with the control channel. For example, wireless devices 205-a and 205-b may calculate a first cyclic shift associated with a control channel for communications between the wireless devices 205-a and 205-b. Additionally, wireless devices 205-a and 205-c may calculate a second cyclic shift (e.g., different from the first cyclic shift) associated with a control channel for communications between the wireless devices 205-a and 205-c. In some cases, one of the wireless devices 205 may calculate the cyclic shift associated with the control channel by identifying the cyclic shift associated with transmitting a message via the control channel. For example, the wireless device 205-a may identify a cyclic shift associated with transmitting a message to the wireless device 205-b via the control channel. In some other cases, one of the wireless devices 205 may calculate the cyclic shift associated with the control channel by estimating the cyclic shift associated with receiving a message via the control channel. For example, the wireless device 205-b may estimate a cyclic shift associated with receiving a message from the wireless device 205-a via the control channel. In either case, both wireless devices may calculate a same cyclic shift associated with the control channel and may subsequently identify a same reference signal sequence for the reference signal 215 based on the calculated cyclic shift.

The set of possible reference signal sequences may be predefined by an equation known by the wireless devices 205. For example, the wireless devices 205 may utilize the defined equation to identify the reference signal sequence of the reference signal 215. Here, the defined equation may define the set of possible reference signal sequences (e.g., based on possible values for different variables within the defined equation) and each wireless device 205 may utilize the defined equation to select one of the possible reference signal sequences for the reference signal 215. Equation 1, shown below, illustrates an example equation that the wireless devices 205 may utilize to identify the reference signal sequence of the reference signals 215.

$$\text{Seed} = f_{CRC} \cdot 2^{14} + \mod(k_{val}, 100) \cdot (1 + i_{Cyclic\ Shift}) \cdot 2^3 + 510 \quad (5)$$

In the example of Equation 1, Seed may correspond to the reference signal sequence. Additionally, $f_{CRC}$ may correspond to a function based on an CRC associated with a control channel between the wireless devices 205, $k_{val}$ may be a value based on a subframe (e.g., for transmitting the reference signal 215), and $i_{Cyclic\ Shift}$ may be based on a cyclic shift of the control channel between the wireless devices 205.

After identifying a sequence for the reference signal 215, a wireless device 205 may transmit the reference signal 215 via the channel 210 (e.g., a shared channel). For example, the wireless device 205-a may transmit the reference signal 215-a to the wireless device 205-b. Additionally or alternatively, the wireless device 205-b may transmit the reference signal 215-a to the wireless device 205-a. In another example, the wireless device 205-a may transmit the reference signal 215-*b* to the wireless device 205-*c*. Additionally or alternatively, the wireless device 205-*c* may transmit the reference signal 215-*b* to the wireless device 205-*a*. In a case that wireless devices 205-*b* and 205-*c* transmit reference signals 215 to the wireless device 205-*a*, the wireless device 205-*a* may receive reference signals 215-*a* and 215-*b*. Here, because each of the reference signals 215 are based on different cyclic shifts, the wireless device 205-*a* may detect each of the reference signals 215 (e.g., due to less cross interference between the reference signals 215).

Additionally, in cases that the wireless device 205-*a* transmits the reference signals 215 to the wireless devices 205-*b* and 205-*c*, each of the wireless devices 205-*b* and 205-*c* may detect the reference signals 215-*a* and 215-*b*, respectively (e.g., due to less cross interference between the reference signals 215). For example, wireless device 205-*b* may not be aware of the wireless 205-*c*, but may successfully decode the reference signal 215-*a* due to the lower cross interference from the reference signal 215-*b* (e.g., when compared to cross interference from a reference signal 215 that is not based on a different cyclic shift).

Based on receiving the reference signal 215, a wireless device 205 may perform one or more channel estimations on the channel 210. That is, the wireless device 205 may descramble the reference signal 215 (e.g., to perform frequency offset estimation). The wireless device 205 may descramble the reference signal 215 in the frequency domain or the time domain. In some cases, performing the frequency offset estimation in the time domain may provide more reliable offset estimations in high Doppler scenarios (e.g., when the wireless devices 205 are moving at high speeds relative to each other, such as V2V communications) when compared to performing frequency offset estimations in the frequency domain. In either case, the wireless devices 205 may perform frequency offset estimations based on receiving the reference signal 215.

After performing one or more channel estimations, the wireless devices 205 may communicate (e.g., communications 220) via the channels 210. That is, the wireless devices 205 may transmit or receive the communications 220 based on identified frequency offset estimations.

Figure 3:
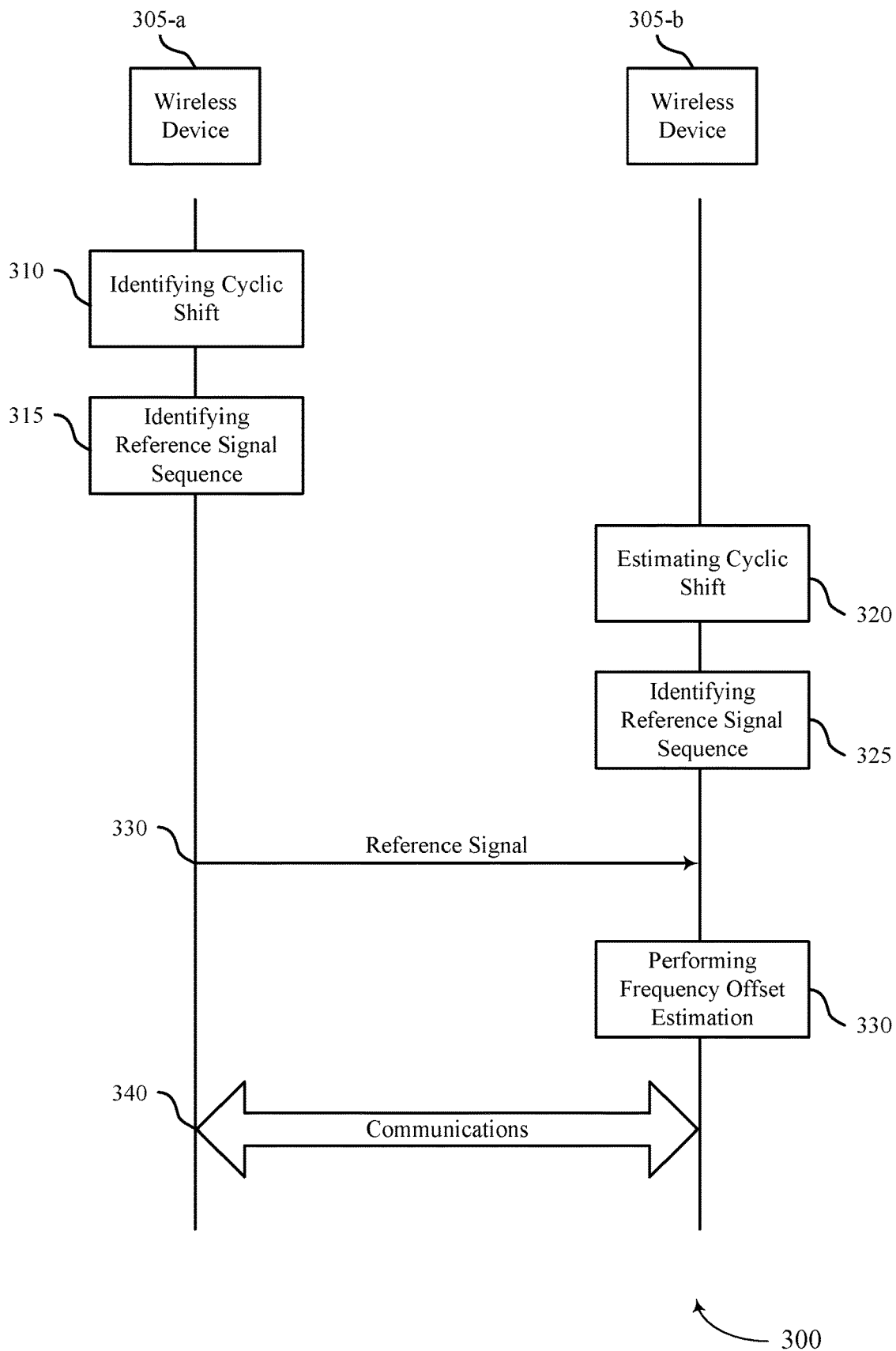
FIG. 3 illustrates an example of a process flow that supports reference signal sequence generation in accordance with aspects of the present disclosure.

FIG. 3 illustrates an example of a process flow 300 that supports reference signal sequence generation in accordance with aspects of the present disclosure. In some examples, process flow 300 may implement aspects of wireless communication system 100. For example, the process flow 300 may include wireless devices 305, which may be examples of a base station 105, a UE 115, or wireless devices 205 as described with reference to FIGS. 1 and 2.

At 310, the wireless device 305-*a* may identify (e.g., calculate) a cyclic shift associated with transmitting a message to the wireless device 305-*b* via a control channel. For example, the wireless device 305-*a* may identify the cyclic shift applied to messages transmitted by the wireless device 305-*a*, to the wireless device 305-*b*, via the control channel.

At 315, the wireless device 305-*a* may identify a reference signal sequence based on the identified cyclic shift. For example, the wireless device 305-*a* may identify the reference signal sequence based on a defined equation for generating reference signal sequences that is based on the cyclic shift associated with control channel.

At 320, the wireless device 305-*b* may estimate (e.g., calculate) the cyclic shift associated with receiving a message via the control channel from the wireless device 305-*a*. That is, the wireless device 305-*b* may estimate the cyclic shift applied to messages for the wireless device 305-*b* that may be received from the wireless device 305-*a* via the control channel.

At 325, the wireless device 305-*b* may identify the reference signal sequence based on the estimated cyclic shift. For example, the wireless device 305-*b* may identify the reference signal sequence based on a defined equation for generating reference signal sequences that is based on the cyclic shift associated with control channel.

At 330, the wireless device 305-*a* may transmit the reference signal sequence to the wireless device 305-*b* via a shared channel.

At 335, the wireless device 305-*b* may perform a frequency offset estimation for the shared channel based on receiving the reference signal sequence.

At 340, the wireless devices 305-*a* and 305-*b* may communicate based on performing the frequency offset estimation.

Figure 4:
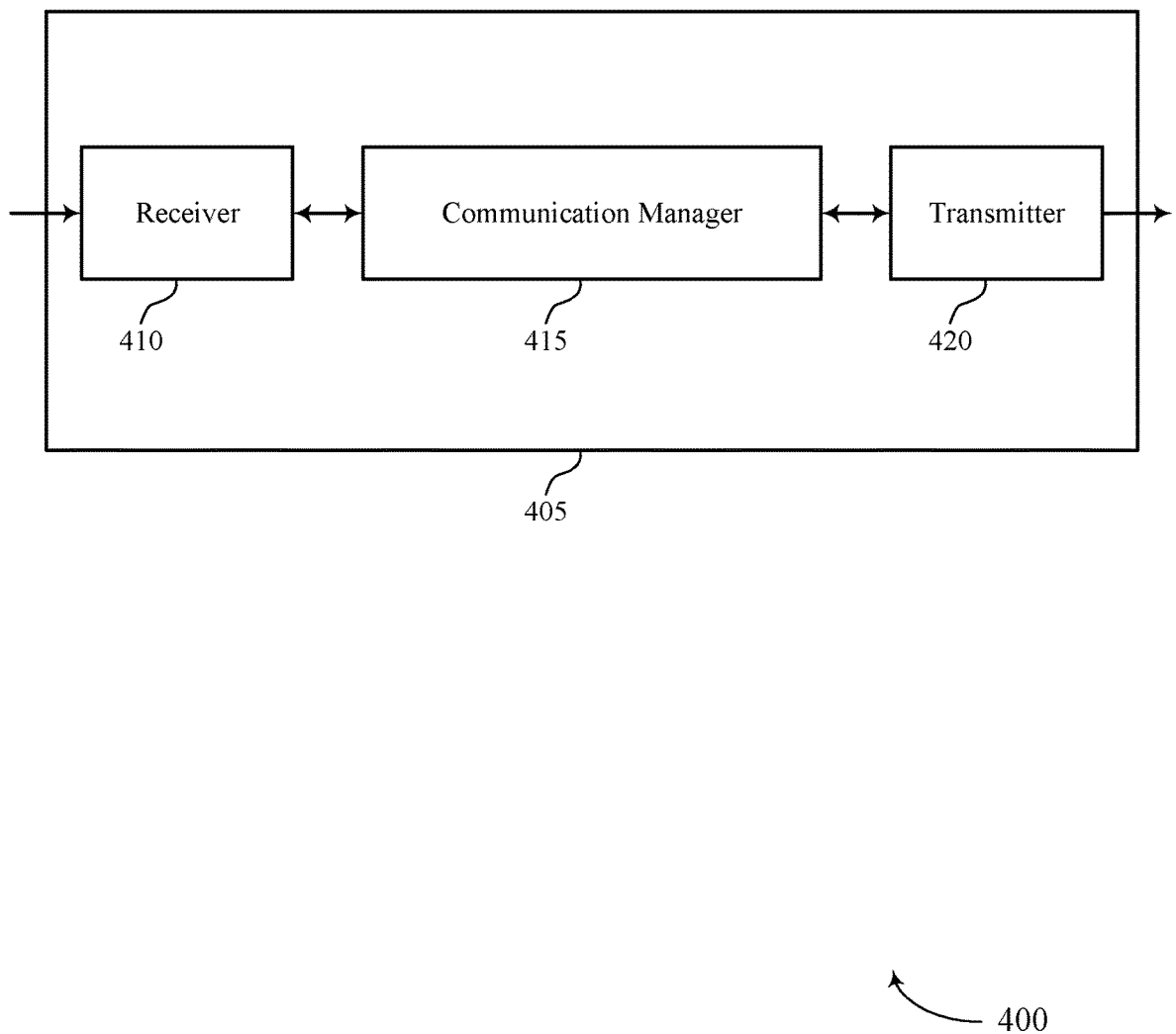
FIGS. 4 and 5 show block diagrams of devices that support reference signal sequence generation in accordance with aspects of the present disclosure.

FIG. 4 shows a block diagram 400 of a device 405 that supports reference signal sequence generation in accordance with aspects of the present disclosure. The device 405 may be an example of aspects of a UE 115 or base station 105 as described herein. The device 405 may include a receiver 410, a communication manager 415, and a transmitter 420. The device 405 may also include a processor. Each of these components may be in communication with one another (e.g., via one or more buses).

Receiver 410 may receive information such as packets, user data, or control information associated with various information channels (e.g., control channels, data channels, and information related to reference signal sequence generation, etc.). Information may be passed on to other components of the device 405. The receiver 410 may be an example of aspects of the transceiver 720 or 820 as described with reference to FIGS. 7 and 8. The receiver 410 may utilize a single antenna or a set of antennas.

The communication manager 415 may calculate a cyclic shift associated with a control channel for communications with a second wireless device, identify a reference signal sequence based on the cyclic shift associated with the control channel, and communicate with the second wireless device based on the reference signal sequence. The communication manager 415 may be an example of aspects of the communication manager 710 or 810 as described herein.

The communication manager 415, or its sub-components, may be implemented in hardware, code (e.g., software or firmware) executed by a processor, or any combination thereof. If implemented in code executed by a processor, the functions of the communication manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 415, or its sub-components, may be physically located at various positions, including being distributed such that portions of functions are implemented at different physical locations by one or more physical components. In some examples, the communication manager 415, or its sub-components, may be a separate and distinct component in accordance with various aspects of the present disclosure. In some examples, the communication manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 420 may transmit signals generated by other components of the device 405. In some examples, the transmitter 420 may be collocated with a receiver 410 in a transceiver module. For example, the transmitter 420 may be an example of aspects of the transceiver 720 or 820 as described with reference to FIGS. 7 and 8. The transmitter 420 may utilize a single antenna or a set of antennas.

Figure 5:
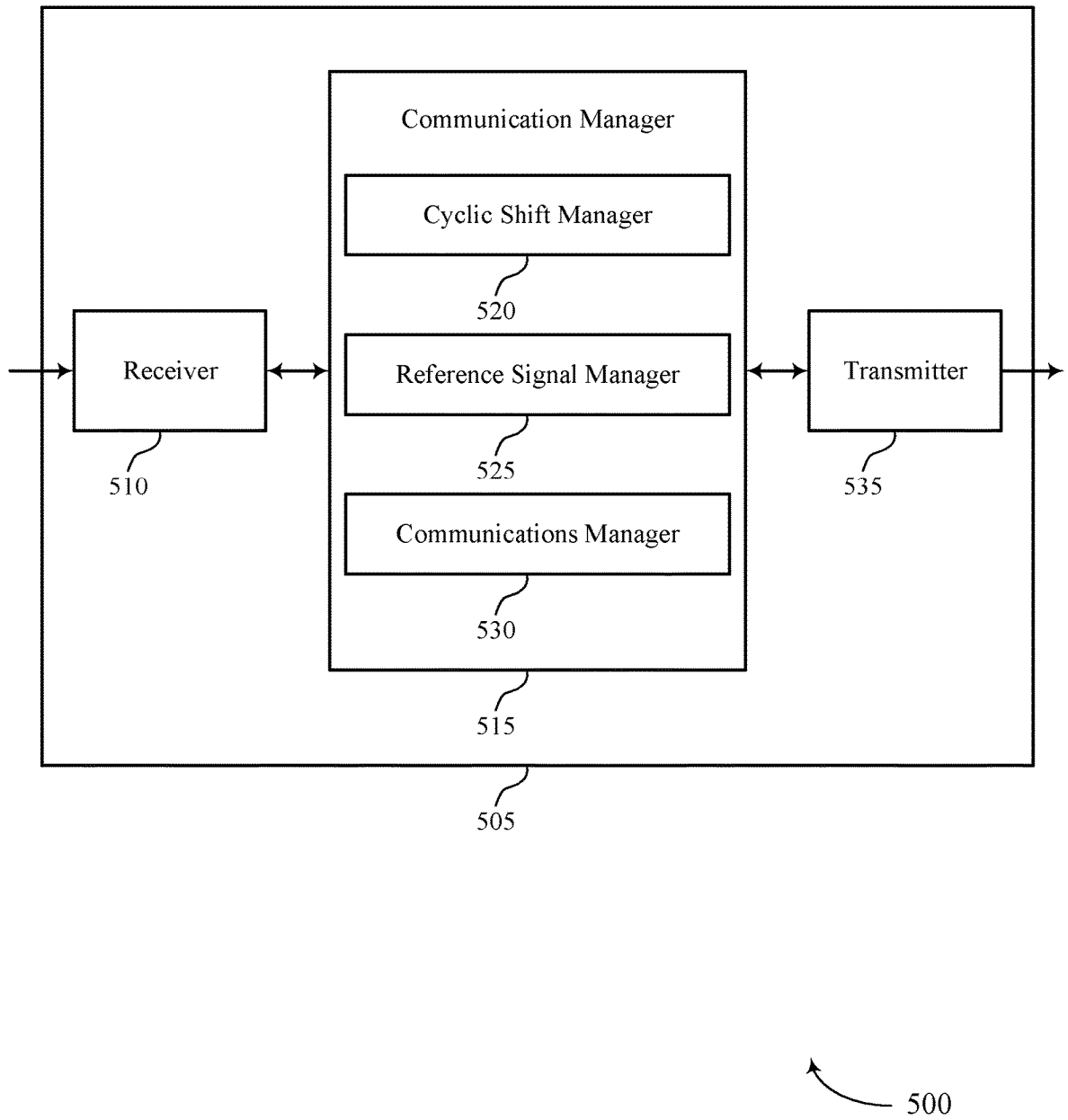

FIG. 5 shows a block diagram 500 of a device 505 that supports reference signal sequence generation in accordance with aspects of the present disclosure. The device 505 may be an example of aspects of a device 405, a UE 115, or a base station 105 as described herein. The device 505 may include a receiver 510, a communication manager 515, and a transmitter 535. The device 505 may also include a processor. Each of these components may be in communication with one another (e.g., via one or more buses).

Receiver 510 may receive information such as packets, user data, or control information associated with various information channels (e.g., control channels, data channels, and information related to reference signal sequence generation, etc.). Information may be passed on to other components of the device 505. The receiver 510 may be an example of aspects of the transceiver 720 or 820 as described with reference to FIGS. 7 and 8. The receiver 510 may utilize a single antenna or a set of antennas.

The communication manager 515 may be an example of aspects of the communication manager 415 as described herein. The communication manager 515 may include a cyclic shift manager 520, a reference signal manager 525, and a communications manager 530. The communication manager 515 may be an example of aspects of the communication manager 710 or 810 as described herein.

The cyclic shift manager 520 may calculate a cyclic shift associated with a control channel for communications with a second wireless device.

The reference signal manager 525 may identify a reference signal sequence based on the cyclic shift associated with the control channel.

The communications manager 530 may communicate with the second wireless device based on the reference signal sequence.

Transmitter 535 may transmit signals generated by other components of the device 505. In some examples, the transmitter 535 may be collocated with a receiver 510 in a transceiver module. For example, the transmitter 535 may be an example of aspects of the transceiver 720 or 820 as described with reference to FIGS. 7 and 8. The transmitter 535 may utilize a single antenna or a set of antennas.

Figure 6:
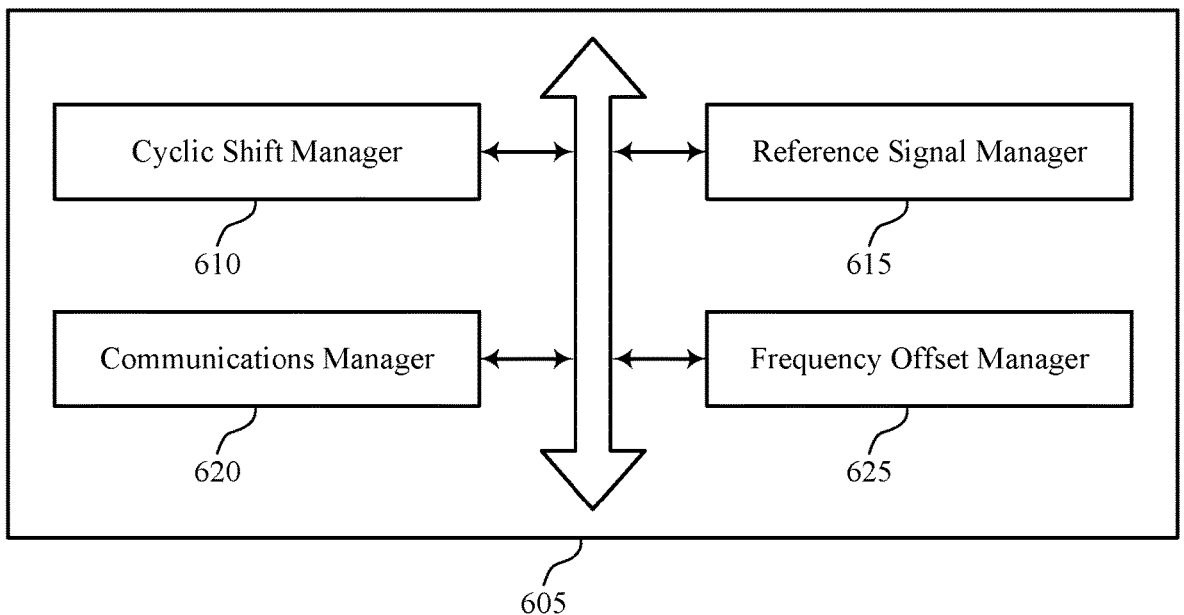
FIG. 6 shows a block diagram of a communications manager that supports reference signal sequence generation in accordance with aspects of the present disclosure.

FIG. 6 shows a block diagram 600 of a communication manager 605 that supports reference signal sequence generation in accordance with aspects of the present disclosure. The communication manager 605 may be an example of aspects of a communication manager 415, a communication manager 515, or a communication manager 710 described herein. The communication manager 605 may include a cyclic shift manager 610, a reference signal manager 615, a communications manager 620, and a frequency offset manager 625. Each of these modules may communicate, directly or indirectly, with one another (e.g., via one or more buses).

The cyclic shift manager 610 may calculate a cyclic shift associated with a control channel for communications with a second wireless device. In some examples, the cyclic shift manager 610 may identify the cyclic shift associated with transmitting a message to the second wireless device via the control channel. In some cases, the cyclic shift manager 610 may estimate the cyclic shift associated with receiving a message from the second wireless device via the control channel. In some instances, the cyclic shift manager 610 may calculate a second cyclic shift, different from the cyclic shift, associated with the control channel for communications with a third wireless device.

The reference signal manager 615 may identify a reference signal sequence based on the cyclic shift associated with the control channel. In some cases, the reference signal manager 615 may identify a second reference signal sequence based on the second cyclic shift associated with the control channel for communications with the third wireless device. In some instances, the reference signal manager 615 may select the reference signal sequence from more than ten possible reference signal sequences. In some examples, the reference signal manager 615 may calculate a cyclic redundancy check associated with the control channel for communications with the second wireless device, where identifying the reference signal sequence is based on the reference signal sequence. In some cases, the reference signal sequence is a DMRS sequence.

The communications manager 620 may communicate with the second wireless device based on the reference signal sequence. In some examples, the communications manager 620 may communicate with the third wireless device based on the second reference signal sequence. In some cases, the communications manager 620 may transmit the reference signal sequence to the second wireless device via a shared channel based on the identifying. In some instances, the communications manager 620 may receive the reference signal sequence from the second wireless device via a shared channel. In some examples, the communications manager 620 may receive, from a third wireless device, a second reference signal sequence via the shared channel, the second reference signal sequence based on a second cyclic shift, different from the cyclic shift, that is associated with the control channel for communications with the third wireless device. In some cases, the communications manager 620 may transmit or receiving one or more messages with the second wireless device based on the frequency offset estimation.

The frequency offset manager 625 may perform, in a time domain, a frequency offset estimation for communications with the second wireless device based on receiving the reference signal sequence.

Figure 7:
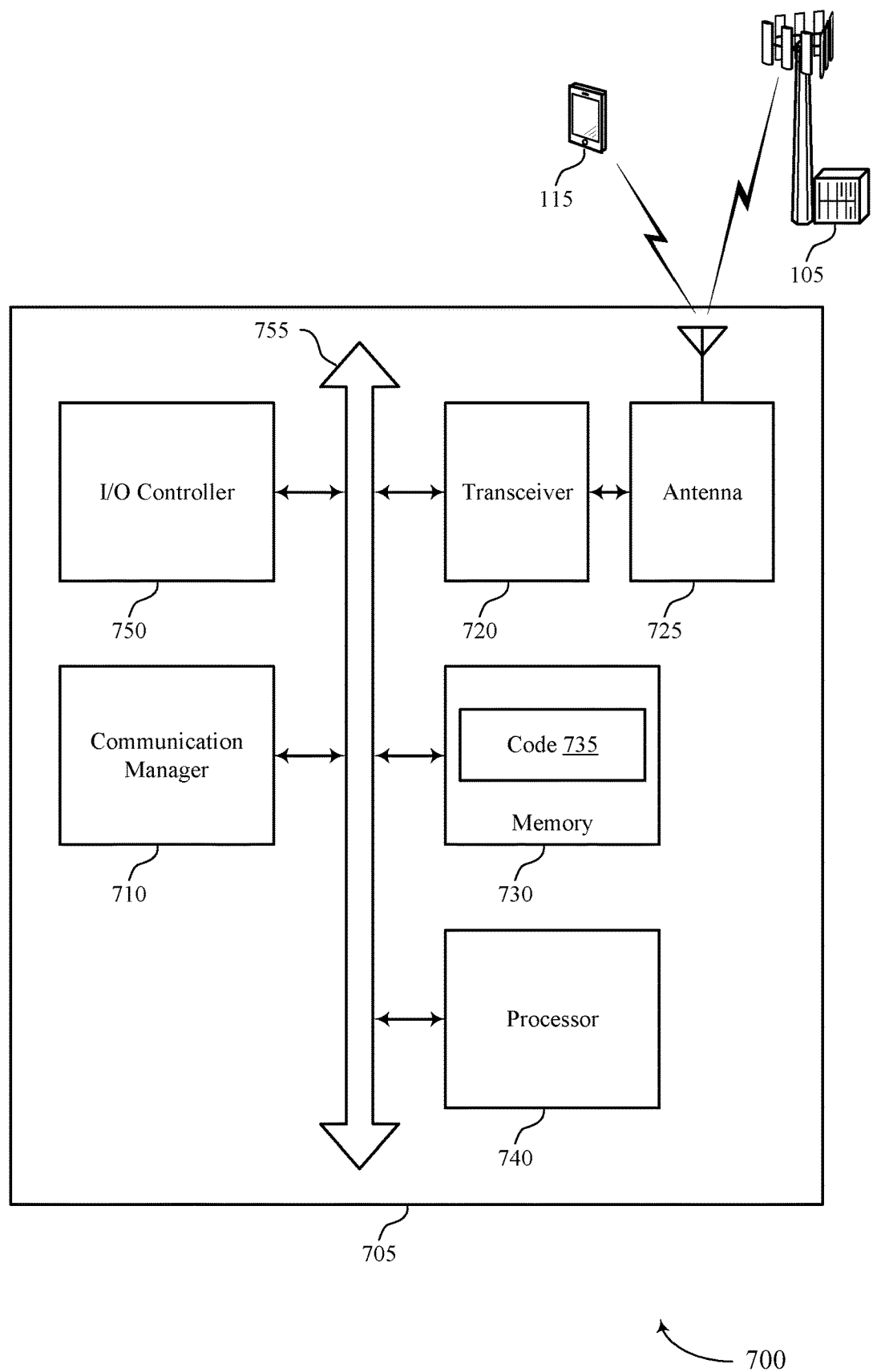
FIG. 7 shows a diagram of a system including a user equipment (UE) that supports reference signal sequence generation in accordance with aspects of the present disclosure.

FIG. 7 shows a diagram of a system 700 including a device 705 that supports reference signal sequence generation in accordance with aspects of the present disclosure. The device 705 may be an example of or include the components of device 405, device 505, or a UE 115 as described herein. The device 705 may include components for bi-directional voice and data communications including components for transmitting and receiving communications, including a communication manager 710, a transceiver 720, an antenna 725, memory 730, a processor 740, and an I/O controller 750. These components may be in electronic communication via one or more buses (e.g., bus 755).

The communication manager 710 may calculate a cyclic shift associated with a control channel for communications with a second wireless device, identify a reference signal sequence based on the cyclic shift associated with the control channel, and communicate with the second wireless device based on the reference signal sequence.

Transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM), read-only memory (ROM), or a combination thereof. The memory 730 may store computer-readable code 735 including instructions that, when executed by a processor (e.g., the processor 740) cause the device to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting reference signal sequence generation).

The I/O controller 750 may manage input and output signals for the device 705. The I/O controller 750 may also manage peripherals not integrated into the device 705. In some cases, the I/O controller 750 may represent a physical connection or port to an external peripheral. In some cases, the I/O controller 750 may utilize an operating system such as iOS®, ANDROID®, MS-DOS®, MS-WINDOWS®, OS/2®, UNIX®, LINUX®, or another known operating system. In other cases, the I/O controller 750 may represent or interact with a modem, a keyboard, a mouse, a touch-screen, or a similar device. In some cases, the I/O controller 750 may be implemented as part of a processor. In some cases, a user may interact with the device 705 via the I/O controller 750 or via hardware components controlled by the I/O controller 750.

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
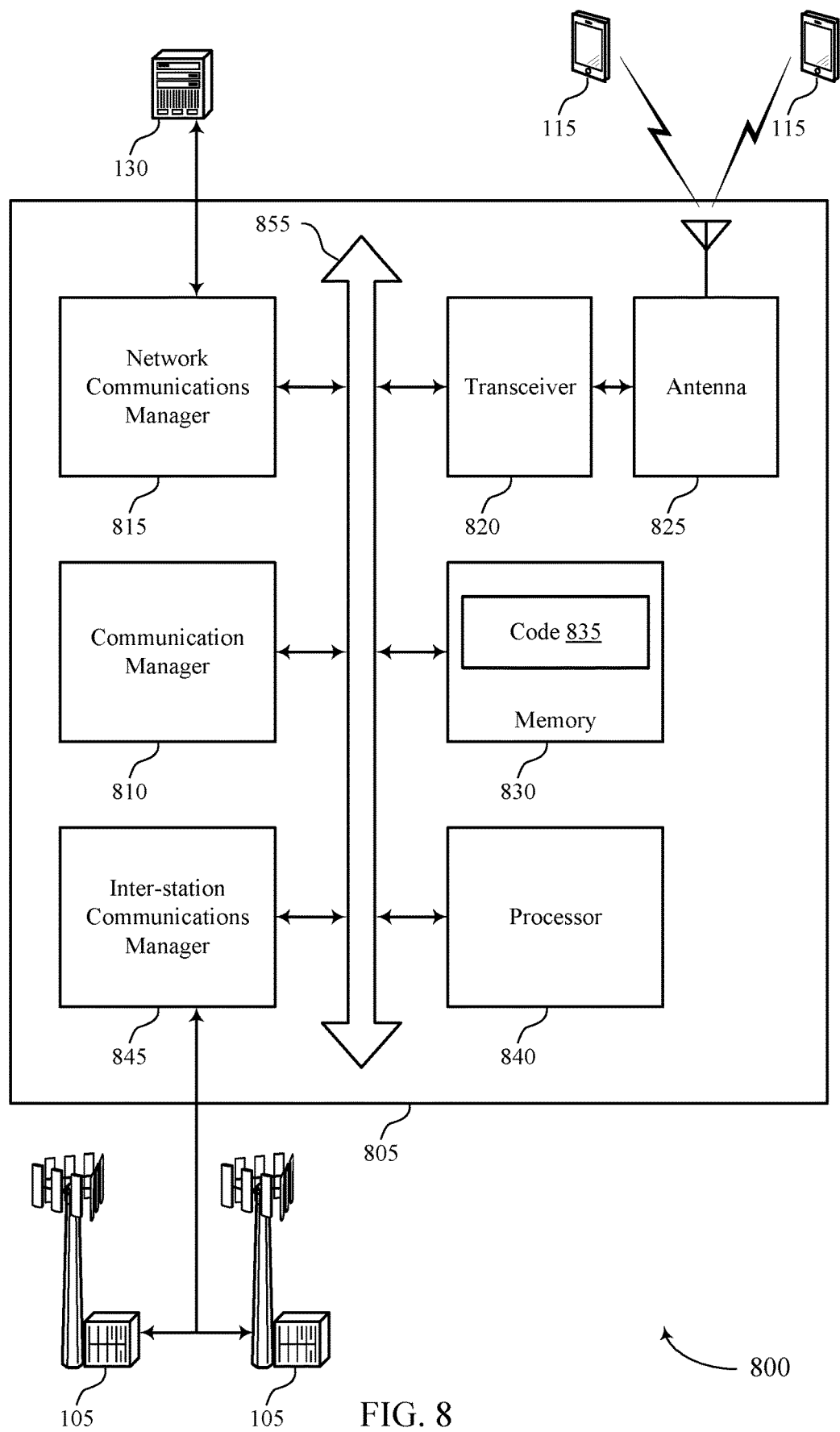
FIG. 8 shows a diagram of a system including a base station that supports reference signal sequence generation in accordance with aspects of the present disclosure.

FIG. 8 shows a diagram of a system 800 including a device 805 that supports reference signal sequence generation in accordance with aspects of the present disclosure. The device 805 may be an example of or include the components of device 405, device 505, or a base station 105 as described herein. The device 805 may include components for bi-directional voice and data communications including components for transmitting and receiving communications, including a communication manager 810, a network communications manager 815, a transceiver 820, an antenna 825, memory 830, a processor 840, and an inter-station communications manager 845. These components may be in electronic communication via one or more buses (e.g., bus 855).

The communication manager 810 may calculate a cyclic shift associated with a control channel for communications with a second wireless device, identify a reference signal sequence based on the cyclic shift associated with the control channel, and communicate with the second wireless device based on the reference signal sequence.

Network communications manager 815 may manage communications with the core network (e.g., via one or more wired backhaul links). For example, the network communications manager 815 may manage the transfer of data communications for client devices, such as one or more UEs 115.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal sequence generation).

Inter-station communications manager 845 may manage communications with other base station 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
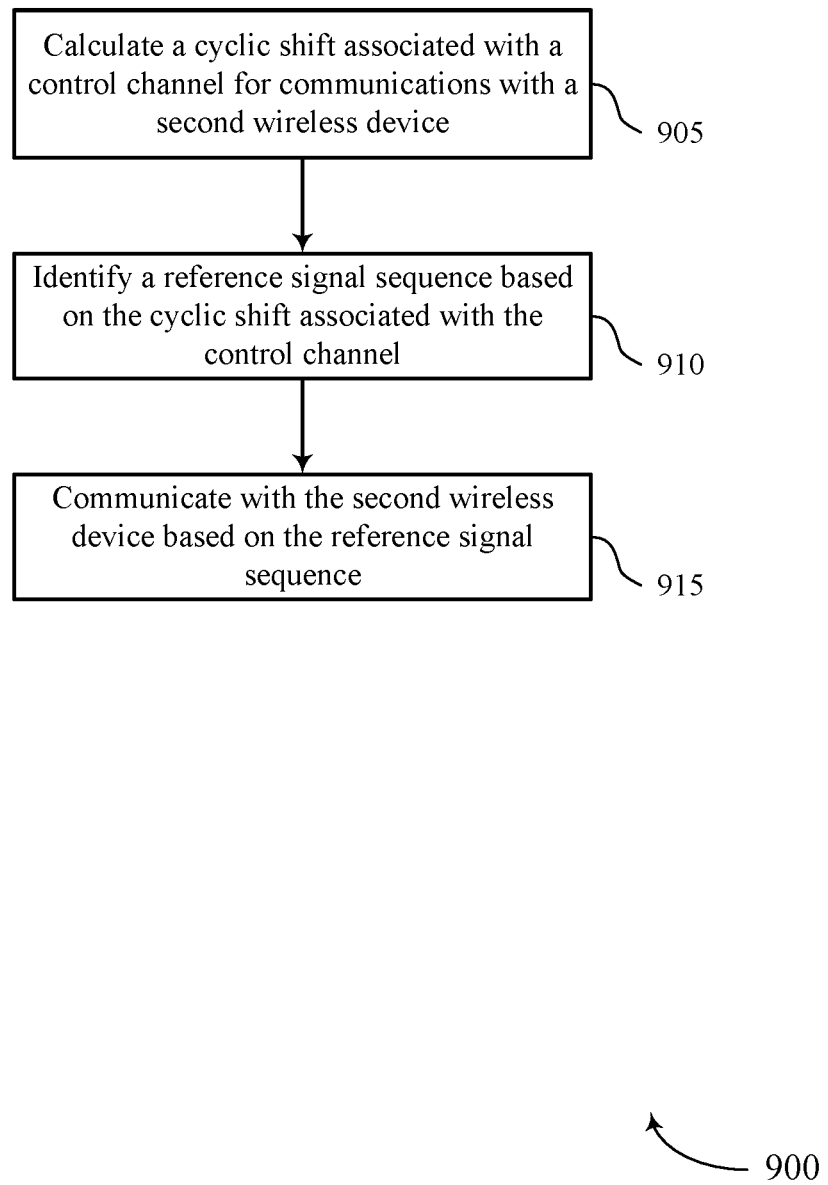
FIGS. 9 through 11 show flowcharts illustrating methods that support reference signal sequence generation in accordance with aspects of the present disclosure.

FIG. 9 shows a flowchart illustrating a method 900 that supports reference signal sequence generation in accordance with aspects of the present disclosure. The operations of method 900 may be implemented by a UE 115 or base station 105 or its components as described herein. For example, the operations of method 900 may be performed by a communication manager as described with reference to FIGS. 4 through 8. In some examples, a UE or base station may execute a set of instructions to control the functional elements of the UE or base station to perform the functions described below. Additionally or alternatively, a UE or base station may perform aspects of the functions described below using special-purpose hardware.

At 905, the UE or base station may calculate a cyclic shift associated with a control channel for communications with a second wireless device. The operations of 905 may be performed according to the methods described herein. In some examples, aspects of the operations of 905 may be performed by a cyclic shift manager as described with reference to FIGS. 4 through 8.

At 910, the UE or base station may identify a reference signal sequence based on the cyclic shift associated with the control channel. The operations of 910 may be performed according to the methods described herein. In some examples, aspects of the operations of 910 may be performed by a reference signal manager as described with reference to FIGS. 4 through 8.

At 915, the UE or base station may communicate with the second wireless device based on the reference signal sequence. The operations of 915 may be performed according to the methods described herein. In some examples, aspects of the operations of 915 may be performed by a communications manager as described with reference to FIGS. 4 through 8.

Figure 10:
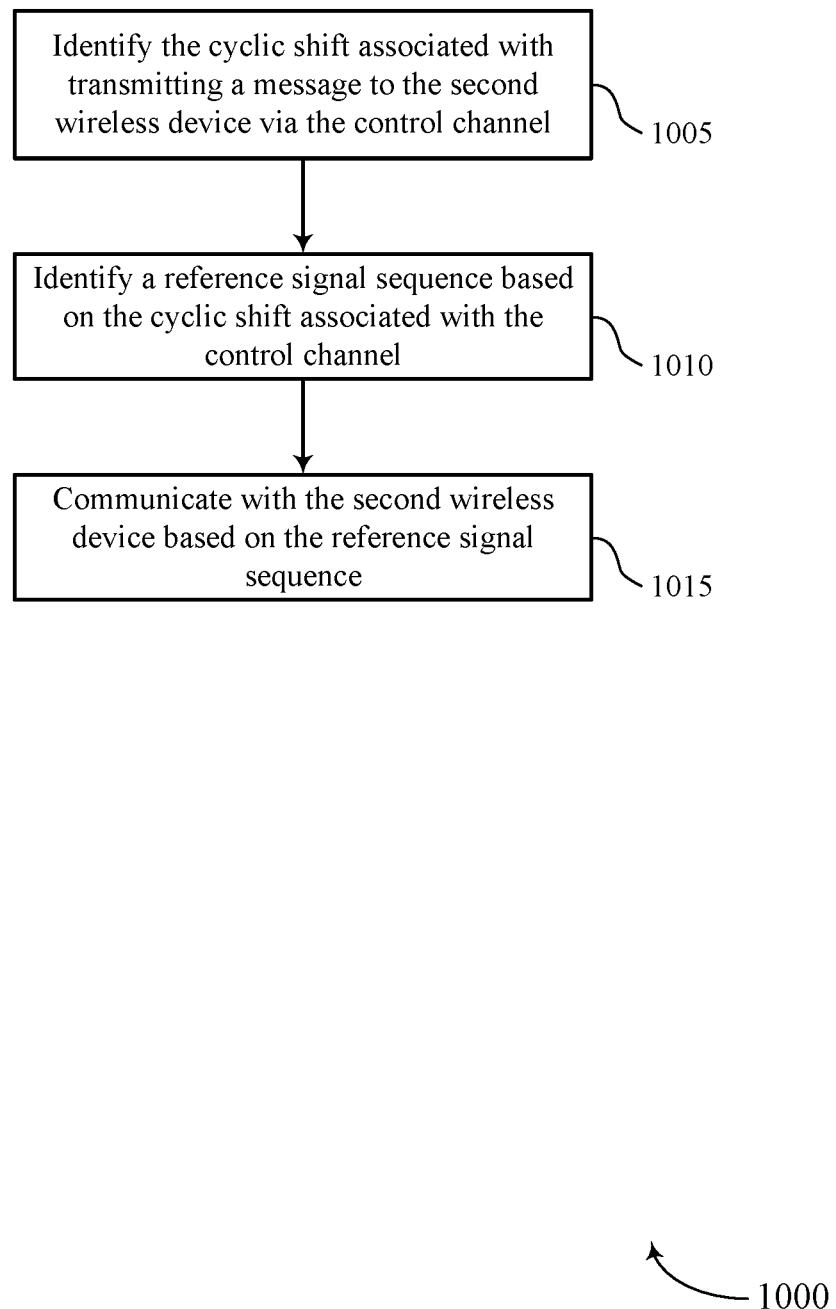

FIG. 10 shows a flowchart illustrating a method 1000 that supports reference signal sequence generation in accordance with aspects of the present disclosure. The operations of method 1000 may be implemented by a UE 115 or base station 105 or its components as described herein. For example, the operations of method 1000 may be performed by a communication manager as described with reference to FIGS. 4 through 8. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may identify the cyclic shift associated with transmitting a message to a second wireless device via a control channel. The operations of 1005 may be performed according to the methods described herein. In some examples, aspects of the operations of 1005 may be performed by a cyclic shift manager as described with reference to FIGS. 4 through 8.

At 1010, the UE or base station may identify a reference signal sequence based on the cyclic shift associated with the control channel. The operations of 1010 may be performed according to the methods described herein. In some examples, aspects of the operations of 1010 may be performed by a reference signal manager as described with reference to FIGS. 4 through 8.

At 1015, the UE or base station may communicate with the second wireless device based on the reference signal sequence. The operations of 1015 may be performed according to the methods described herein. In some examples, aspects of the operations of 1015 may be performed by a communications manager as described with reference to FIGS. 4 through 8.

Figure 11:
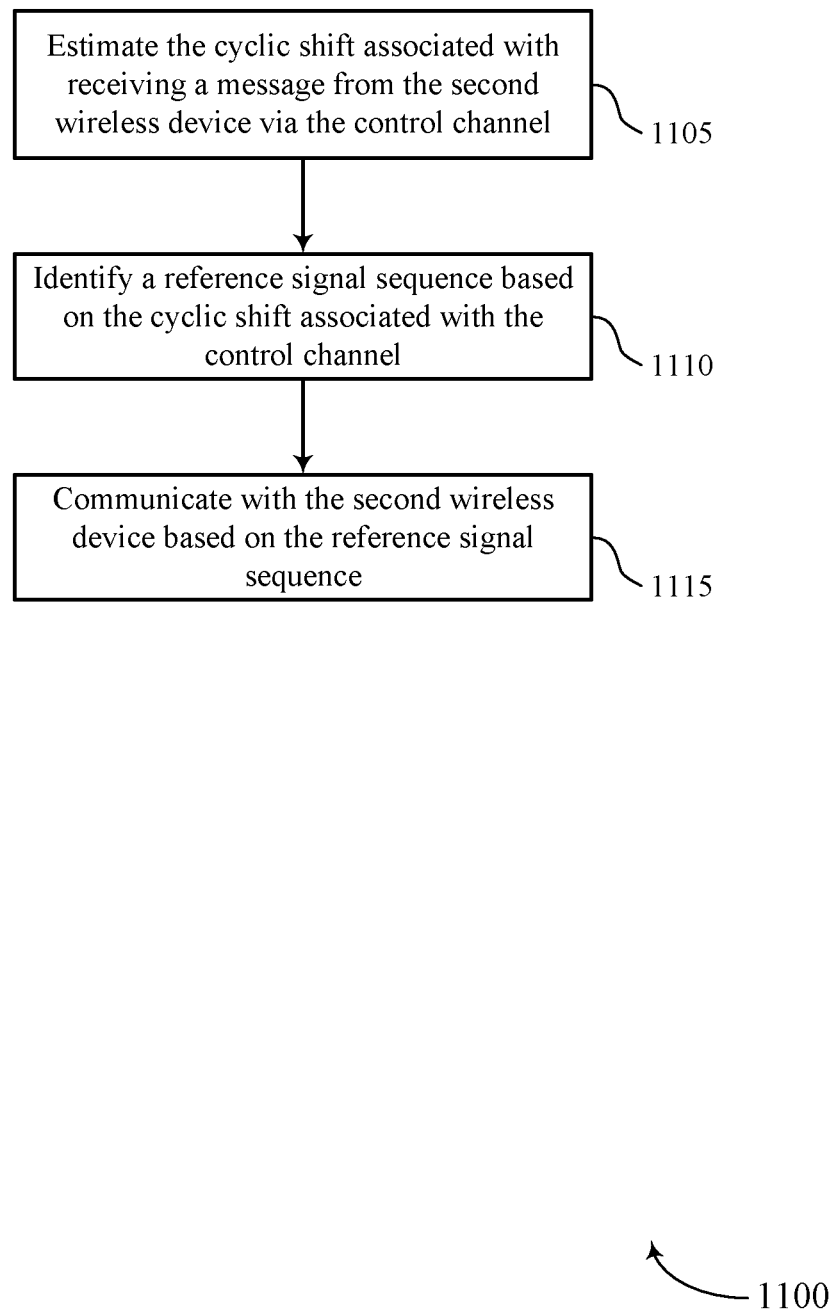

FIG. 11 shows a flowchart illustrating a method 1100 that supports reference signal sequence generation in accordance with aspects of the present disclosure. The operations of method 1100 may be implemented by a UE 115 or base station 105 or its components as described herein. For example, the operations of method 1100 may be performed by a communication manager as described with reference to FIGS. 4 through 8. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may estimate the cyclic shift associated with receiving a message from a second wireless device via a control channel. The operations of 1105 may be performed according to the methods described herein. In some examples, aspects of the operations of 1105 may be performed by a cyclic shift manager as described with reference to FIGS. 4 through 8.

At 1110, the UE or base station may identify a reference signal sequence based on the cyclic shift associated with the control channel. The operations of 1110 may be performed according to the methods described herein. In some examples, aspects of the operations of 1110 may be performed by a reference signal manager as described with reference to FIGS. 4 through 8.

At 1115, the UE or base station may communicate with the second wireless device based on the reference signal sequence. The operations of 1115 may be performed according to the methods described herein. In some examples, aspects of the operations of 1115 may be performed by a communications manager as described with reference to FIGS. 4 through 8.

It should be noted that the methods described herein describe possible implementations, and that the operations and the steps may be rearranged or otherwise modified and that other implementations are possible. Further, aspects from two or more of the methods may be combined.

The following aspects are given by way of illustration. Aspects of the following aspects may be combined with aspects or embodiments shown or discussed in relation to the figures or elsewhere herein.

Aspect 1 is a method for wireless communication at a first wireless device, comprising: calculating a cyclic shift associated with a control channel for communications with a second wireless device; identifying a reference signal sequence based at least in part on the cyclic shift associated with the control channel; and communicating with the second wireless device based at least in part on the reference signal sequence.

In aspect 2, the calculating the cyclic shift of aspect 1 includes identifying the cyclic shift associated with transmitting a message to the second wireless device via the control channel.

In aspect 3, the calculating the cyclic shift of aspect 1 includes estimating the cyclic shift associated with receiving a message from the second wireless device via the control channel.

In aspect 4, the method of any of aspects 1 through 3 includes calculating a second cyclic shift, different from the cyclic shift, associated with the control channel for communications with a third wireless device; identifying a second reference signal sequence based at least in part on the second cyclic shift associated with the control channel for communications with the third wireless device; and communicating with the third wireless device based at least in part on the second reference signal sequence.

In aspect 5, the communicating with the second wireless device of any of aspects 1 through 4 includes transmitting the reference signal sequence to the second wireless device via a shared channel based at least in part on the identifying.

In aspect 6, the communicating with the second wireless device of any of aspects 1 through 4 includes receiving the reference signal sequence from the second wireless device via a shared channel.

In aspect 7, the method of any of aspects 1 through 6 includes receiving, from a third wireless device, a second reference signal sequence via the shared channel, the second reference signal sequence based at least in part on a second cyclic shift, different from the cyclic shift, that is associated with the control channel for communications with the third wireless device.

In aspect 8, the method of any of aspects 1 through 7 includes performing, in a time domain, a frequency offset estimation for communications with the second wireless device based at least in part on receiving the reference signal sequence; and transmitting or receiving one or more messages with the second wireless device based at least in part on the frequency offset estimation.

In aspect 9, the identifying the reference signal sequence of aspects 1 through 8 includes selecting the reference signal sequence from more than ten possible reference signal sequences.

In aspect 10, the method of any of aspects 1 through 9 includes calculating a CRC associated with the control channel for communications with the second wireless device, wherein identifying the reference signal sequence is based at least in part on the reference signal sequence.

In aspect 11, the reference signal sequence of any of aspects 1 through 10 is a DMRS.

Aspect 12 is a system or apparatus including means for implementing a method or realizing an apparatus as in any of aspects 1 through 11.

Aspect 13 is a non-transitory computer-readable medium storing instructions executable by one or more processors to cause the one or more processors to implement a method as in any of aspects 1 through 11.

Aspect 14 is a system including one or more processors and memory in electronic communication with the one or more processors storing instructions executable by the one or more processors to cause the system or apparatus to implement a method as in any of aspects 1 through 11.

Examples of these aspects may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
    calculating a cyclic shift associated with a control channel for communications with a second wireless device;
    identifying a reference signal sequence that is based at least in part on a first value, a second value, and a third value,
    wherein the first value is based at least in part on the cyclic shift associated with the control channel, the second value is based at least in part on a cyclic redundancy check associated with the control channel, and the third value is based at least in part on a subframe for communicating the reference signal sequence with the second wireless device; and
    communicating with the second wireless device based at least in part on the reference signal sequence.

2. The method of claim 1, wherein calculating the cyclic shift comprises:
    identifying the cyclic shift associated with transmitting a message to the second wireless device via the control channel.

3. The method of claim 1, wherein calculating the cyclic shift comprises:
    estimating the cyclic shift associated with receiving a message from the second wireless device via the control channel.

4. The method of claim 1, further comprising:
    calculating a second cyclic shift, different from the cyclic shift, associated with the control channel for communications with a third wireless device;
    identifying a second reference signal sequence based at least in part on the second cyclic shift associated with the control channel for communications with the third wireless device; and
    communicating with the third wireless device based at least in part on the second reference signal sequence.

5. The method of claim 1, wherein communicating with the second wireless device comprises:
    transmitting the reference signal sequence to the second wireless device via a shared channel based at least in part on the identifying.

6. The method of claim 1, wherein communicating with the second wireless device comprises:
    receiving the reference signal sequence from the second wireless device via a shared channel.

7. The method of claim 6, further comprising:
    receiving, from a third wireless device, a second reference signal sequence via the shared channel, the second reference signal sequence based at least in part on a second cyclic shift, different from the cyclic shift, that is associated with the control channel for communications with the third wireless device.

8. The method of claim 6, further comprising:
    performing, in a time domain, a frequency offset estimation for communications with the second wireless device based at least in part on receiving the reference signal sequence; and
    transmitting or receiving one or more messages with the second wireless device based at least in part on the frequency offset estimation.

9. The method of claim 1, wherein identifying the reference signal sequence comprises:
    selecting the reference signal sequence from more than ten possible reference signal sequences.

10. The method of claim 1, further comprising:
    calculating the cyclic redundancy check associated with the control channel for communications with the second wireless device,
    wherein identifying the reference signal sequence is based at least in part on calculating the cyclic redundancy check.

11. The method of claim 1, wherein the reference signal sequence is a demodulation reference signal sequence.

12. An apparatus for wireless communication at a first wireless device, comprising:
    a processor,
    memory coupled with the processor; and
    instructions stored in the memory and executable by the processor to cause the apparatus to:
        calculate a cyclic shift associated with a control channel for communications with a second wireless device;
        identify a reference signal sequence that is based at least in part on a first value, a second value, and a third value,
        wherein the first value is based at least in part on the cyclic shift associated with the control channel, the second value is based at least in part on a cyclic redundancy check associated with the control channel, and the third value is based at least in part on a subframe for communicating the reference signal sequence with the second wireless device; and communicate with the second wireless device based at least in part on the reference signal sequence.

13. The apparatus of claim 12, wherein the instructions to calculate the cyclic shift are executable by the processor to cause the apparatus to:

identify the cyclic shift associated with transmitting a message to the second wireless device via the control channel.

14. The apparatus of claim 12, wherein the instructions to calculate the cyclic shift are executable by the processor to cause the apparatus to:

estimate the cyclic shift associated with receiving a message from the second wireless device via the control channel.

15. The apparatus of claim 12, wherein the instructions are further executable by the processor to cause the apparatus to:

calculate a second cyclic shift, different from the cyclic shift, associated with the control channel for communications with a third wireless device;

identify a second reference signal sequence based at least in part on the second cyclic shift associated with the control channel for communications with the third wireless device; and communicate with the third wireless device based at least in part on the second reference signal sequence.

16. The apparatus of claim 12, wherein the instructions to communicate with the second wireless device are executable by the processor to cause the apparatus to:

transmit the reference signal sequence to the second wireless device via a shared channel based at least in part on the identifying.

17. The apparatus of claim 12, wherein the instructions to communicate with the second wireless device are executable by the processor to cause the apparatus to:

receive the reference signal sequence from the second wireless device via a shared channel.

18. The apparatus of claim 17, wherein the instructions are further executable by the processor to cause the apparatus to:

receive, from a third wireless device, a second reference signal sequence via the shared channel, the second reference signal sequence based at least in part on a second cyclic shift, different from the cyclic shift, that is associated with the control channel for communications with the third wireless device.

19. The apparatus of claim 17, wherein the instructions are further executable by the processor to cause the apparatus to:

perform, in a time domain, a frequency offset estimation for communications with the second wireless device based at least in part on receiving the reference signal sequence; and transmit or receiving one or more messages with the second wireless device based at least in part on the frequency offset estimation.

20. The apparatus of claim 12, wherein the instructions to identify the reference signal sequence are executable by the processor to cause the apparatus to:

select the reference signal sequence from more than ten possible reference signal sequences.

21. The apparatus of claim 12, wherein the instructions are further executable by the processor to cause the apparatus to:

calculate the cyclic redundancy check associated with the control channel for communications with the second wireless device, wherein identifying the reference signal sequence is based at least in part on calculating the cyclic redundancy check.

22. The apparatus of claim 12, wherein the reference signal sequence is a demodulation reference signal sequence.

23. An apparatus for wireless communication at a first wireless device, comprising:

means for calculating a cyclic shift associated with a control channel for communications with a second wireless device;

means for identifying a reference signal sequence that is based at least in part on a first value, a second value, and a third value, wherein the first value is based at least in part on the cyclic shift associated with the control channel, the second value is based at least in part on a cyclic redundancy check associated with the control channel, and the third value is based at least in part on a subframe for communicating the reference signal sequence with the second wireless device; and means for communicating with the second wireless device based at least in part on the reference signal sequence.

24. The apparatus of claim 23, wherein the means for calculating the cyclic shift comprises:

means for identifying the cyclic shift associated with transmitting a message to the second wireless device via the control channel.

25. The apparatus of claim 23, wherein the means for calculating the cyclic shift comprises:

means for estimating the cyclic shift associated with receiving a message from the second wireless device via the control channel.

26. The apparatus of claim 23, further comprising:

means for calculating a second cyclic shift, different from the cyclic shift, associated with the control channel for communications with a third wireless device;

means for identifying a second reference signal sequence based at least in part on the second cyclic shift associated with the control channel for communications with the third wireless device; and means for communicating with the third wireless device based at least in part on the second reference signal sequence.

27. The apparatus of claim 23, wherein the means for communicating with the second wireless device comprises:

means for transmitting the reference signal sequence to the second wireless device via a shared channel based at least in part on the identifying.

28. The apparatus of claim 23, wherein the means for communicating with the second wireless device comprises:

means for receiving the reference signal sequence from the second wireless device via a shared channel.

29. The apparatus of claim 28, further comprising:

means for receiving, from a third wireless device, a second reference signal sequence via the shared channel, the second reference signal sequence based at least in part on a second cyclic shift, different from the cyclic shift, that is associated with the control channel for communications with the third wireless device.

30. The apparatus of claim 28, further comprising:

means for performing, in a time domain, a frequency offset estimation for communications with the second wireless device based at least in part on receiving the reference signal sequence; and means for transmitting or receiving one or more messages with the second wireless device based at least in part on the frequency offset estimation.

31. The apparatus of claim 23, wherein the means for identifying the reference signal sequence comprises:
means for selecting the reference signal sequence from more than ten possible reference signal sequences.

32. The apparatus of claim 23, further comprising:
means for calculating the cyclic redundancy check associated with the control channel for communications with the second wireless device,
wherein identifying the reference signal sequence is based at least in part on calculating the cyclic redundancy check.

33. The apparatus of claim 23, wherein the reference signal sequence is a demodulation reference signal sequence.

34. A non-transitory computer-readable medium storing code for wireless communication at a first wireless device, the code comprising instructions executable by a processor to:
calculate a cyclic shift associated with a control channel for communications with a second wireless device;
identify a reference signal sequence that is based at least in part on a first value, a second value, and a third value, wherein the first value is based at least in part on the cyclic shift associated with the control channel, the second value is based at least in part on a cyclic redundancy check associated with the control channel, and the third value is based at least in part on a subframe for communicating the reference signal sequence with the second wireless device; and
communicate with the second wireless device based at least in part on the reference signal sequence.

35. The non-transitory computer-readable medium of claim 34, wherein the instructions to calculate the cyclic shift are executable to:
identify the cyclic shift associated with transmitting a message to the second wireless device via the control channel.

36. The non-transitory computer-readable medium of claim 34, wherein the instructions to calculate the cyclic shift are executable to:
estimate the cyclic shift associated with receiving a message from the second wireless device via the control channel.

37. The non-transitory computer-readable medium of claim 34, wherein the instructions are further executable to:
calculate a second cyclic shift, different from the cyclic shift, associated with the control channel for communications with a third wireless device;
identify a second reference signal sequence based at least in part on the second cyclic shift associated with the control channel for communications with the third wireless device; and
communicate with the third wireless device based at least in part on the second reference signal sequence.

38. The non-transitory computer-readable medium of claim 34, wherein the instructions to communicate with the second wireless device are executable to:
transmit the reference signal sequence to the second wireless device via a shared channel based at least in part on the identifying.

39. The non-transitory computer-readable medium of claim 34, wherein the instructions to communicate with the second wireless device are executable to:
receive the reference signal sequence from the second wireless device via a shared channel.

40. The non-transitory computer-readable medium of claim 39, wherein the instructions are further executable to:
receive, from a third wireless device, a second reference signal sequence via the shared channel, the second reference signal sequence based at least in part on a second cyclic shift, different from the cyclic shift, that is associated with the control channel for communications with the third wireless device.

41. The non-transitory computer-readable medium of claim 39, wherein the instructions are further executable to:
perform, in a time domain, a frequency offset estimation for communications with the second wireless device based at least in part on receiving the reference signal sequence; and
transmit or receiving one or more messages with the second wireless device based at least in part on the frequency offset estimation.

42. The non-transitory computer-readable medium of claim 34, wherein the instructions to identify the reference signal sequence are executable to:
select the reference signal sequence from more than ten possible reference signal sequences.

43. The non-transitory computer-readable medium of claim 34, wherein the instructions are further executable to:
calculate the cyclic redundancy check associated with the control channel for communications with the second wireless device,
wherein identifying the reference signal sequence is based at least in part on calculating the cyclic redundancy check.

44. The non-transitory computer-readable medium of claim 34, wherein the reference signal sequence is a demodulation reference signal sequence.

45. The method of claim 1, wherein:
the first value is based at least in part on a summation of the cyclic shift and an integer;
the second value is based at least in part on a function of the cyclic redundancy check;
the third value is based at least in part on a modulo operation on a fourth value indicating the subframe for communicating the reference signal sequence with the second wireless device; and
the reference signal sequence is based at least in part on a product of the first value, the second value, and the third value.

* * * * *